US006404161B1

(12) United States Patent

Roubinet et al.

(10) Patent No.: US 6,404,161 B1

(45) Date of Patent: Jun. 11, 2002

(54) SELF-CALIBRATED CIRCUIT FOR THE MEASUREMENT OF TIME INTERVALS

(75) Inventors: David Roubinet, Peynier; Stéphane Guilhot, Yssingeaux, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/374,177

(22) Filed: Aug. 13, 1999

(30) Foreign Application Priority Data

Aug. 13, 1998 (FR) ........................................... 98 10367

(51) Int. Cl.[7] ............................ H02P 1/46; H02P 3/18; H02P 5/28; H02P 7/36

(52) U.S. Cl. ....................... 318/705; 318/715; 318/721; 377/48

(58) Field of Search ................................ 318/700, 705, 318/711, 713, 715, 720, 724; 377/51, 48, 54, 52

(56) References Cited

U.S. PATENT DOCUMENTS

| | | | | | |
|---|---|---|---|---|---|
| 3,662,163 | A | * | 5/1972 | Miller et al. | 235/197 |
| 3,917,927 | A | | 11/1975 | Minton | 235/92 TF |
| 3,990,007 | A | | 11/1976 | Hohhof | 324/78 Q |
| 4,031,476 | A | * | 6/1977 | Goldberg | 328/39 |
| 4,277,747 | A | | 7/1981 | Harvey | 324/78 D |
| 4,546,487 | A | | 10/1985 | Dackow | 377/51 |
| 4,668,900 | A | * | 5/1987 | Tabuchi | 318/608 |
| 4,760,536 | A | | 7/1988 | Curtis | 364/484 |
| 4,947,411 | A | * | 8/1990 | Shiraishi et al. | 377/47 |
| 5,065,415 | A | * | 11/1991 | Yamashita | 377/52 |
| 5,084,907 | A | * | 1/1992 | Maemura | 377/28 |
| 5,325,049 | A | * | 6/1994 | Hayashi et al. | 324/76.41 |
| 5,349,622 | A | * | 9/1994 | Gorisse | 377/52 |
| 5,650,738 | A | * | 7/1997 | Taylor et al. | 327/237 |
| 5,933,058 | A | * | 8/1999 | Pinto et al. | 331/17 |
| 6,198,353 | B1 | * | 3/2001 | Janesch et al. | 331/16 |

FOREIGN PATENT DOCUMENTS

EP 0 801 463 A1 4/1997

* cited by examiner

*Primary Examiner*—Marlon T. Fletcher
*Assistant Examiner*—Edgardo San Martin
(74) *Attorney, Agent, or Firm*—Lisa K. Jorgenson; Allen, Dyer, Doppelt, Milbrath & Gilchrist, P.A.

(57) ABSTRACT

A circuit for the measurement of time intervals includes a generator providing primary periodic pulses, a frequency divider capable of transmitting secondary periodic pulses for scaling down the frequency of the primary periodic pulses, and a counter for counting the secondary periodic pulses transmitted during the measured time interval. The frequency divider is programmable by a digital factor which determines the frequency division. The circuit further includes a self-calibration circuit for modifying the digital factor as a function of the number of pulses counted by the counter during a previous time interval measurement.

42 Claims, 5 Drawing Sheets

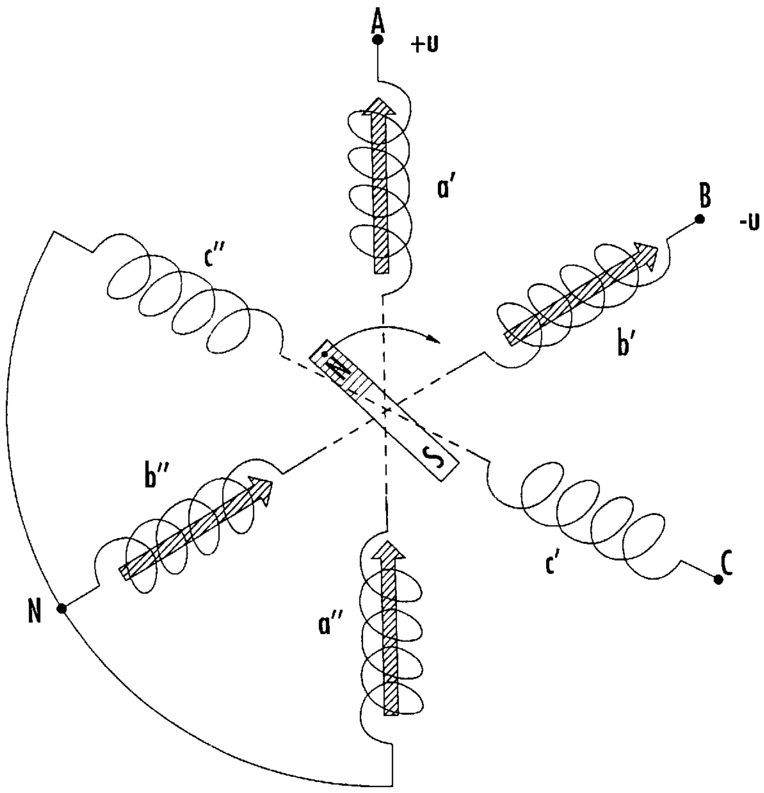
FIG. 8.
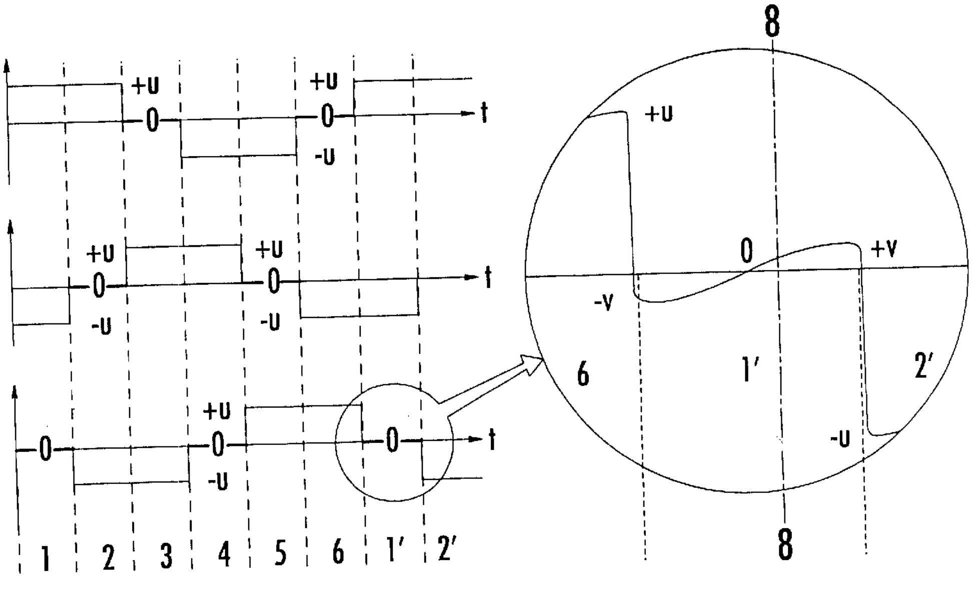
FIG. 9a.
FIG. 9b.
FIG. 9c.
FIG. 9d.

SELF-CALIBRATED CIRCUIT FOR THE MEASUREMENT OF TIME INTERVALS

FIELD OF THE INVENTION

The present invention relates to the field of electronic circuits, and, more particularly, to a chronometer.

BACKGROUND OF THE INVENTION

A chronometry type electronic circuit is illustrated in FIG. 1. This circuit is designed for the digital measurement of the time intervals between short electronic signals Sgn delivered by a sensor, or other circuits of an electronic system. The circuit of FIG. 1 has a generator CLK of periodic pulses H used as a clock signal for a counter CNT, which counts the periodic pulses during each time interval between two signal Sgn pulses. The counter CNT receives a resetting signal at a resetting input Rst for each pulse between two time intervals. The result of the counting is stored in a register REG of the circuit. The result Mes, which represents the digital measurement of a time interval expressed in a number of clock periods, is available at the output of the register REG so that it can be used by the other circuits of the system.

In order that the transfers of the counting results may be done appropriately, the activation Enb of the register REG immediately precedes the resetting Rst and the reactivation Enb of the counter CNT. A logic gate DEL causes a delay by a period t in the transmission of the pulses of the resetting Rst signal between the register Reg and the counter CNT, i.e., from an instant T to an instant T+t.

One drawback of these conventional measurement circuits is that they limit the range of measurement to the capacity of the counter and of the register. The capacity refers to a binary format or number of bits. Another drawback is that the relative error of the digital measurements becomes considerable during the measurement of short time intervals. Ultimately, the measurement of a time interval approximately equal to the period H of the clock signal CLK is effected by an error of one bit on the measurement of one bit, giving a relative error of 100%.

The only way to increase the measuring precision of a circuit of this kind is to increase the clock frequency. However, this adversely effects the range of measurement unless the capacity of the counter and of the register used to make the circuit is increased. The binary format is dictated by the electronic system into which the measuring circuit is integrated. Thus, systems for the control of asynchronous motors, such as those for electronic home appliances, are generally formed by an 8-bit or 16-bit microcontroller for manufacturing cost reasons.

SUMMARY OF THE INVENTION

An object of the invention is to provide an electronic circuit for the measurement of time intervals that overcomes the above described drawbacks.

Thus, the object of the invention is to make a circuit for the measurement of time intervals that combines a wide range of measurements with high precision while limiting the capacity, or more specifically, the binary format of the digital measurements.

This object is achieved by providing for the self-calibration of the measurement circuit as a function of the order of magnitude of the previous measurements of time intervals. A programmable frequency divider is inserted between the pulse generator and the counter to mark the frequency of the periodic pulses that set the pace of the counter. The programming of the frequency division is corrected as a function of the changes in the magnitude of the measurement results.

A time interval measurement circuit according to the present invention comprises a generator of primary periodic pulses, a frequency divider capable of transmitting secondary periodic pulses for scaling down the frequency of the primary periodic pulses, and means for counting the secondary periodic pulses transmitted during the measured time interval. The frequency divider is programmable by a digital factor that determines the frequency division. The circuit comprises self-calibration means capable of modifying the digital factor as a function of the number of pulses counted by the counting means during a previous time interval measurement. Preferably, the divider scales down the frequency of the transmitted periodic pulses by the digital factor raised to the power of two.

The self-calibration means preferably comprises a negative feedback loop incrementing the digital factor when the number of pulses counted by the counting means is greater than a threshold. Preferably, the negative feedback loop increases the digital factor by an increment when the number of pulses is greater than a maximum threshold, and reduces the digital factor by a decrement when the number of pulses is below a minimum threshold. Otherwise, the negative feedback loop does not modify the digital factor when the number of pulses is between the minimum threshold and the maximum threshold.

BRIEF DESCRIPTION OF THE DRAWINGS

Other objects, characteristics, and advantages of the invention shall appear from the following description and from the following drawings, which are given purely by way of exemplary non-restrictive embodiments. On the appended figures.

FIG. 8 illustrates a three-pole PMDC motor with six paired coils that is controlled by a system including the time interval measurement circuit according to the present invention.

FIGS. 9*a*–9*d* illustrate switching cycles for the terminals A, B, C of the PMDC motor illustrated in FIG. 8

DETAILED DESCRIPTION OF THE PREFERRED EMBODIMENTS

Figure 2:
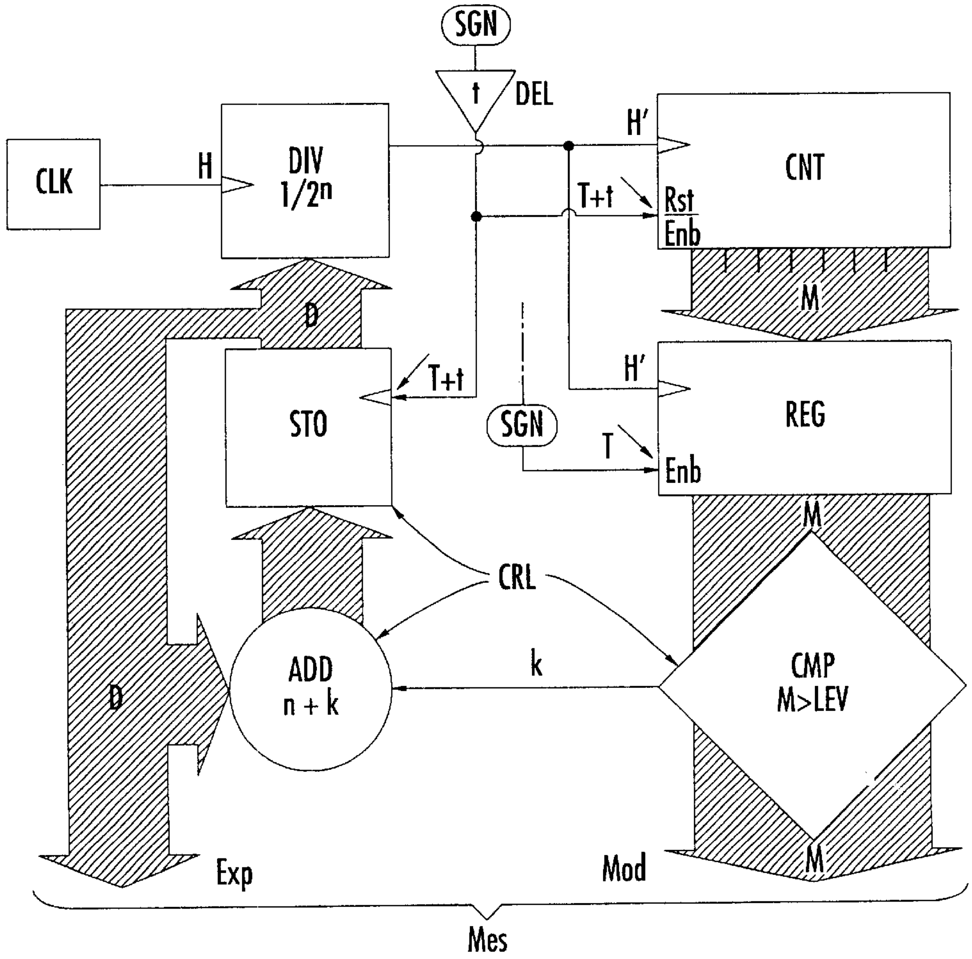
FIG. 2 illustrates a circuit of the time interval measurement circuit according to the present invention.

The diagram of FIG. 2 shows that the circuit according to the present invention is preferably made by the insertion of a programmable frequency divider between the clock CLK and the counter CNT. The frequency divider DIV thus makes it possible for the time base H' of the counter CNT to be modified. The programming of the divider DIV makes it possible for the time base of the counter CNT to be adapted as a function of the spacing of the events, i.e., the spacing of the signal Sgn pulses.

The counter slows down the counting when the time intervals between the pulses diminish, accelerates the counting when the time intervals between the pulses increase, and otherwise maintains the counting rate. The invention therefore provides for programming the frequency divider DIV as a function of the results of the above measurements by means of a negative feedback loop CMP, ADD, STO that collects the counting results and adjusts the divider DIV accordingly.

The divider DIV will scale down the number of clock pulses H, H' that it transmits between the clock generator CLK and the counter CNT by a binary ratio, e.g., an integer power of two. The programmable divider is therefore preferably a $\frac{1}{2}^n$ frequency divider programmed by a digital factor n. The primary periodic pulses H applied at the input to the divider, and the secondary periodic pulses H' available at the output of the divider have periods related by the following formula:

$$P(H')=2^n*P(H) \qquad (I)$$

P(H) and P(H') represent the respective periods of the symbols H and H', expressed in time units. Advantageously, the counting rate may be scaled down by a power of two. This allows for the measurements to be calibrated in steps of half-caliber to half-caliber measurement values, or conversely, in steps of double caliber to double caliber measurement values.

FIG. 2 also shows that the divider is programmed by a negative feedback loop CRL. In this diagram drawing, the digital loop CRL comprises a comparator CMP that is connected to an adder ADD to modify the value of the digital factor n. The resulting value is stored in a circuit STO that is capable of storing a binary number, such as a register or a memory.

In operation, the measurement circuit will carry out the sequence of operations as described in detail below. The counter CNT is set, e.g., at zero, and activated by a first signal Sgn pulse applied to inputs Rst and non-Enb. From this point in time, the binary counter CNT counts the number of secondary periodic pulses H' delivered by the divider DIV. At each secondary pulse H', the counter CNT is incremented with the binary number available at the output thus incrementing from a value M to a value M+1.

As soon a second signal pulse Sgn is applied at instant T, the register REG is activated and stores the value M of the binary number given by the counter CNT. The value M stored by the register REG therefore represents a digital measurement of the time interval between the first signal Sgn pulse and the second signal Sgn pulse. This measurement is expressed in number of clock pulses H'.

Immediately afterwards, at instant T+t, the counter is reset Rst by the second signal pulse Sgn which had been delayed by the period of time t as introduced by the logic gate DEL. The counter is then reactivated via the non-Enb input to perform a measurement. However, the register REG still stores and provides at the output the binary number M. The binary number M represents the measurement of the time interval that has just ended. The output of the register REG is first applied to the input of the comparator circuit CMP, and then transmitted to the output Mod of the measurement circuit itself. The circuit CMP carries out a comparison between the value M of the number of pulses and one or more threshold values Lev.

Provision is made for incrementing the digital factor n, which programs the divider according to the result k of the comparison. According to the diagram drawing of FIG. 2, the comparator CMP controls an adder ADD by a binary signal k. The adder ADD is inserted into a loop ADD, STO for incrementing the digital factor. The increment loop comprises a bus that links the output of the storage register STO, to the input of the adder, whose output is looped to the input of the storage register STO. The storage register STO stores the digital factor n.

As a result, if the binary signal k is zero, i.e., if the result of the comparison CMP is negative, the value n of the digital factor applied to the input of the adder is reproduced identically at the output and re-recorded in the storage circuit STO. In contrast, if the result of the comparison is positive, and if the signal k takes a binary non-zero value, the adder ADD increments the value of the digital factor n according to the value of the signal k. The storage circuit STO then records the new incremented value n+k of the digital factor. The storage circuit STO synchronizes with the signal Sgn pulses delayed by a period t to record the new value of the digital factor. This is done only after the end of each measurement plus the time for making the comparison CMP and the addition ADD.

The digital factor n thus regulates the ratio of the period between the primary pulses H and the secondary pulses H'. However, the digital factor n forms a part of the numerical result of each measurement. A measurement of a time interval is given by the following formula:

$$Mes=M*P(H') \qquad (II)$$

Mes is the duration of the interval between two signal pulses in time units, M is the binary number given by the register at the end of the measurement, and P (H') is the duration of the period of the secondary pulses H' expressed in time units.

According to the formula (I) for establishing a relationship between the periods of the primary pulses H and those of the secondary pulses H', the time interval measurement is therefore given by the following final formula:

$$Mes=M*2^n*p(H) \qquad (III)$$

The variable n is the digital factor programming the frequency divider, and P(H) is the non-varying period of the primary pulse generator expressed in time units. Thus, the digital factor n is given at the output Exp of the measurement circuit.

Finally, the numerical result of a measurement takes the form of a pair (Exp, Mod) of binary numbers that respectively represent the exponent and the modulus of the result. An advantage of a circuit according to the present invention is that it enables the condensing of the digital form of the measurement results Mes. The modulus may then occupy a reduced binary format, i.e., a reduced number of bits, without adversely affecting the measurement range since it covers a number of marks corresponding to the number of values taken for the digital factor.

Furthermore, the circuit according to the present invention has another advantage, which is maintaining a high measurement precision. The form of the measurement results Mes is in the following numerical form:

$$M*2^n \qquad (IV)$$

M is the modulus of the digital measurement, and n is the exponent of the digital measurement. This is similar to the decimal form generally used to express physical measurements, and is written as follows:

$$A*10^x \quad (V)$$

A is the modulus of a decimal measurement, and x is the exponent of the decimal measurement.

The advantage of a binary presentation (Mod, Exp) of this kind is that the modulus Mod representing the significant part of the measurements may be expressed on a reduced and constant number of bits. This is done while preserving the measurement precision regardless of the digital factor or caliber n. Furthermore, with respect to the total number of bits occupied by the measurement results Mes, the modulus Mod and the exponent Exp is smaller than the number of bits of a measurement Mes of the same precision obtained with the conventional circuit illustrated of FIG. 1.

Figure 1:
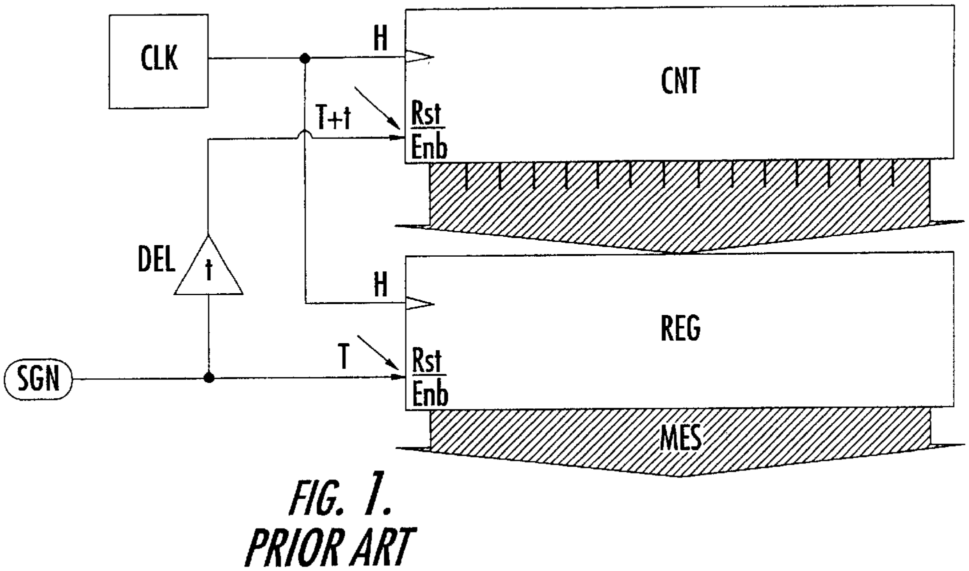
FIG. 1. PRIOR ART
FIG. 1 illustrates a time interval measurement circuit according to the prior art.

As a numerical example for a conventional linear counting circuit, the measurement of frequencies ranges from 78 Hz to 20 kHz, with time intervals ranging form 13 ms to 0.05 ms having a precision of 1%. Such a liner counting circuit requires a 2 MHZ clock and a counter counting from 100 to 25,600. As shown by FIG. 1, the counter and the measurement results Mes have a 15-bit digital format.

With an exponential counting circuit for measuring time intervals in the same range, it is sufficient to have a counter and a register REG with an 8-bit format and a storage register STO with a 3-bit format. The results Mes of the measurements may then be expressed on an 11-bit binary format. To have a precision of 1%, the counter CNT must go from 100 to 256, with the comparator of the incrementation loop CRL having a minimum threshold Lev of 100. Since the digital factor n expressed on 3 bits may take values ranging from 0 to 7, the measurement range takes the following extreme values:

$$Mes_1=100*2^0*0.0005ms=0.05ms$$

$$Mes_1=256*2^7*0.0005ms=16ms$$

One advantage of the measurement circuit according to the present invention is that it condenses the digital format of the measurement results without restricting the measurement precision. Conversely, the measurement circuit advantageously makes it possible to extend the measurement range while maintaining a given digital format.

Preferably, the incrementation loop CRL has two thresholds. A first threshold is a maximum counting threshold, which is a threshold above which the digital factor n is increased by an increment. A second threshold is a minimum counting threshold below which the digital factor n is reduced by one decrement. As long as the measurement results are within the minimum threshold and the maximum threshold, the digital factor n remains unchanged. The incrementation loop can still detect the crossing of the thresholds in various ways. This may be done not only by comparison, but in an equivalent manner, such as by decoding, as will be described in detail below for a first embodiment of the present invention.

Figure 3:
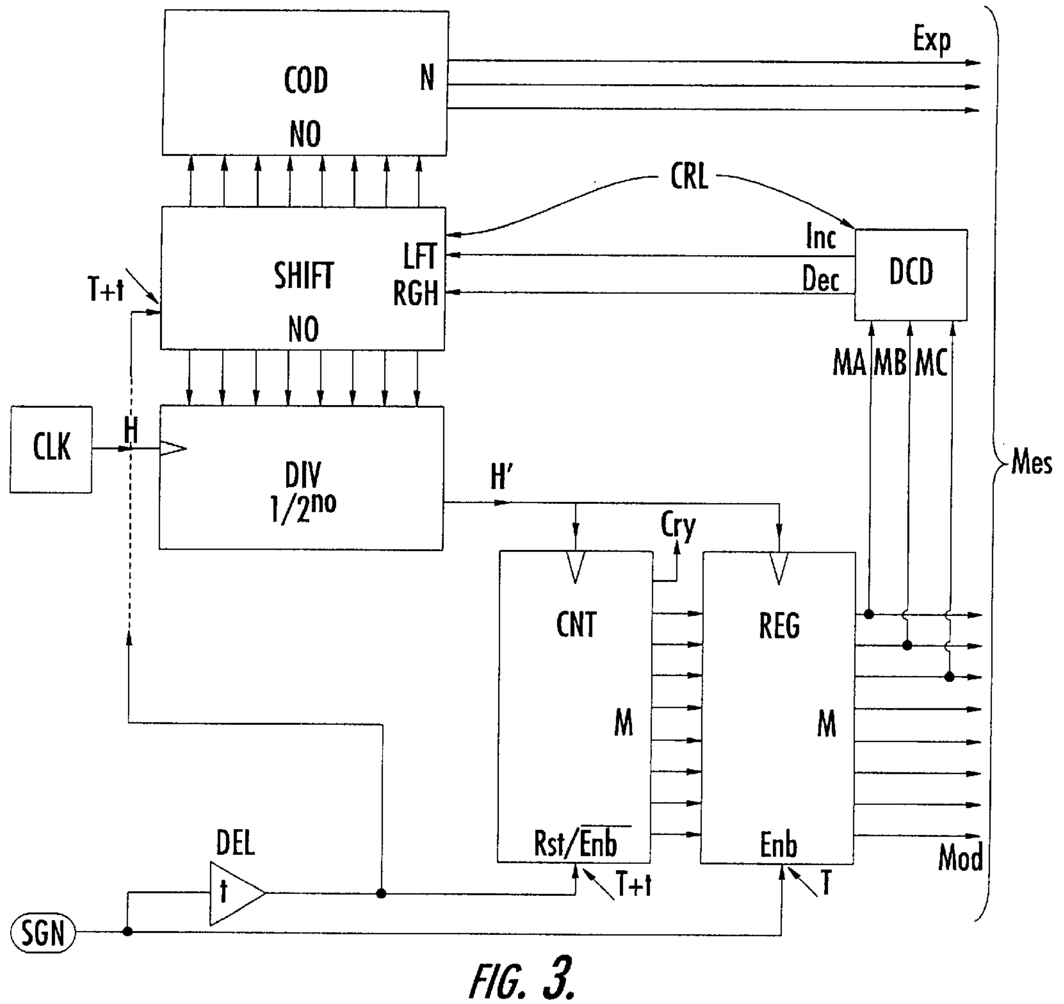
FIG. 3 illustrates a first embodiment of a time interval measurement circuit according to the present invention.

FIG. 3 illustrates an embodiment of a time interval measurement circuit according to the present invention. In this first embodiment, the incrementation loop CRL has a binary decoder DCD with two inputs Inc and Dec connected to a shift register SHFT that delivers a digital factor n0 to program the frequency division. The remainder of the measurement circuit comprises a generator CLK of primary pulses H, a frequency divider DIV generating secondary pulses H', a counter CNT and a register REG.

According to the previous numerical example, the digital factor varies from 0 to 7, but is given by a shift register SHFT which enables, among eight output lines, the output line having the number n0 corresponding to the digital factor. Each measurement result of the measurement circuit can be transmitted to the electronic system in the form of the modulus M and the number n0 corresponding to the frequency division digital factor. In this case, according to the example of FIG. 3, the eight output lines n0 of the shift register SHFT are connected to eight output terminals of the circuits (not shown). This is done to express the number n0 corresponding to the digital factor on 6 bits in the same way as the modulus M1 of the measurement result is expressed on eight output bits Mod. However, it is advantageously planned that an encoder COD connected to the eight lines will receive the number n0 to encode the digital factor in condensed binary form N, i.e., on 3 bits in this example. The measurement result Mes is then presented in 11 bits. The modulus Mes is represented by 8 bits, the exponent Exp is represented by 3 bits.

During operation, the binary number M, which represents the modulus Mod of the measurement and is computed by the counter CNT and the register REG, is decoded by the circuit DCD. The decoder DCD has a minimum threshold Min and a maximum threshold Max. Thresholds Min and Max are shown on the timing diagrams 7*d* and 7*e* of FIG. 7. These timing diagrams illustrate various operating signals. Since the binary number M encoded on 8 bits varies from 0 to 255, it may be convenient to set the minimum threshold Min at a value of 64, and the maximum threshold Max at a value of 192. The decoder DCD of the incrementation loop is then simplified since it is sufficient to decode the two or three most significant bits MA, MB or MC of the binary number M to detect the crossing of the maximum threshold Max with the binary code 11000000, as well as the non-crossing of the minimum threshold Min with the binary code 01000000.

In the event of the crossing of the maximum threshold Max, the decoder DCD activates the increment line Inc. Since the increment line Inc is linked to a leftward shift input Lft of the register SHFT, the register disables the previously active output to enable the neighboring output with the immediately higher number n0. The digital factor is therefore incremented. Conversely, in the event of counting below the minimum threshold Min, the decoder DCD activates the decrement line Dec with the line Inc being inactive. Since the decrement line Dec is connected to a rightward shift input Rgh, the register SHFT then enables the immediately lower number output n0, i.e., the digital factor is decremented or reduced by one decrement.

However, when the counting gives a binary number M between the minimum threshold Min and maximum threshold Max, the decoder DCD does not activate an output line. A binary number M between the minimum threshold Min and maximum threshold Max is provided, for example, when the decoding of the most significant bits MA and MB identifies the code 01 or 10. Since the register SHFT receives inactive state signals Inc and Dec at the inputs Lft and Rgh, no shift is performed in the line enabling. Consequently, the number n0 corresponding to the digital factor does not change, and the rate H' of counting is unchanged.

Figure 4:
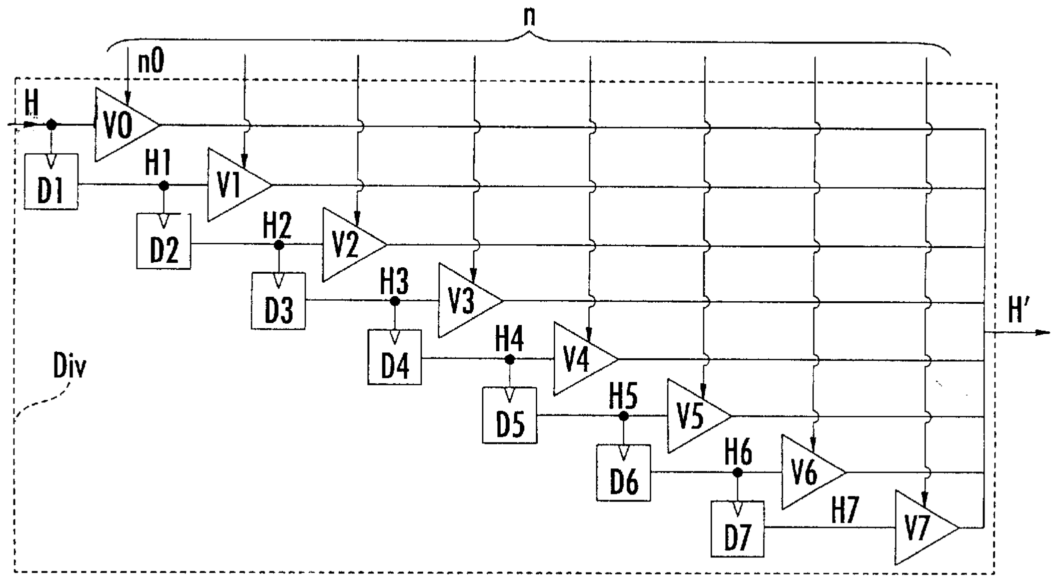
FIG. 4 illustrates a programmable frequency divider implemented in the first embodiment of the time interval measurement circuit illustrated in FIG. 4.

FIG. 4 illustrates an embodiment of a frequency divider DIV that is controlled by the output lines n0 of the shift register SHFT of the measurement circuit according to the first embodiment illustrated in FIG. 3. The divider comprises a series of latch circuits D1 to D7 that are cascade-connected. The elements D1 to D7 are, for example, D latches. Each latch D1 receives periodic pulses H at an input and transmits half-frequency periodic pulses H1 at an output. These output periodic pulses H1 are applied as inputs to the next latch D2. The outputs of the latches D1 to D7 therefore give a series of periodic pulses H1 to H7 with a frequency of $½^{n0}$, according to the rank n0 of the latch. To select a frequency H' of periodic pulses, logic gates V0 to V7 are positioned at the output of the latches D0 to D7 respectively, and a single logic gate is enabled by the output signals n0 of the shift register.

To simplify the connection diagram of the circuit, it is possible to replace the shift register by a counter. Furthermore, to set up increment and decrement thresholds Max and Min having any value, it is possible to replace the decoder by comparators. Alternatives of this type are implemented in the second embodiment illustrated in FIG. 5, thus forming the preferred embodiment of the time interval measurement circuit.

Figure 5:
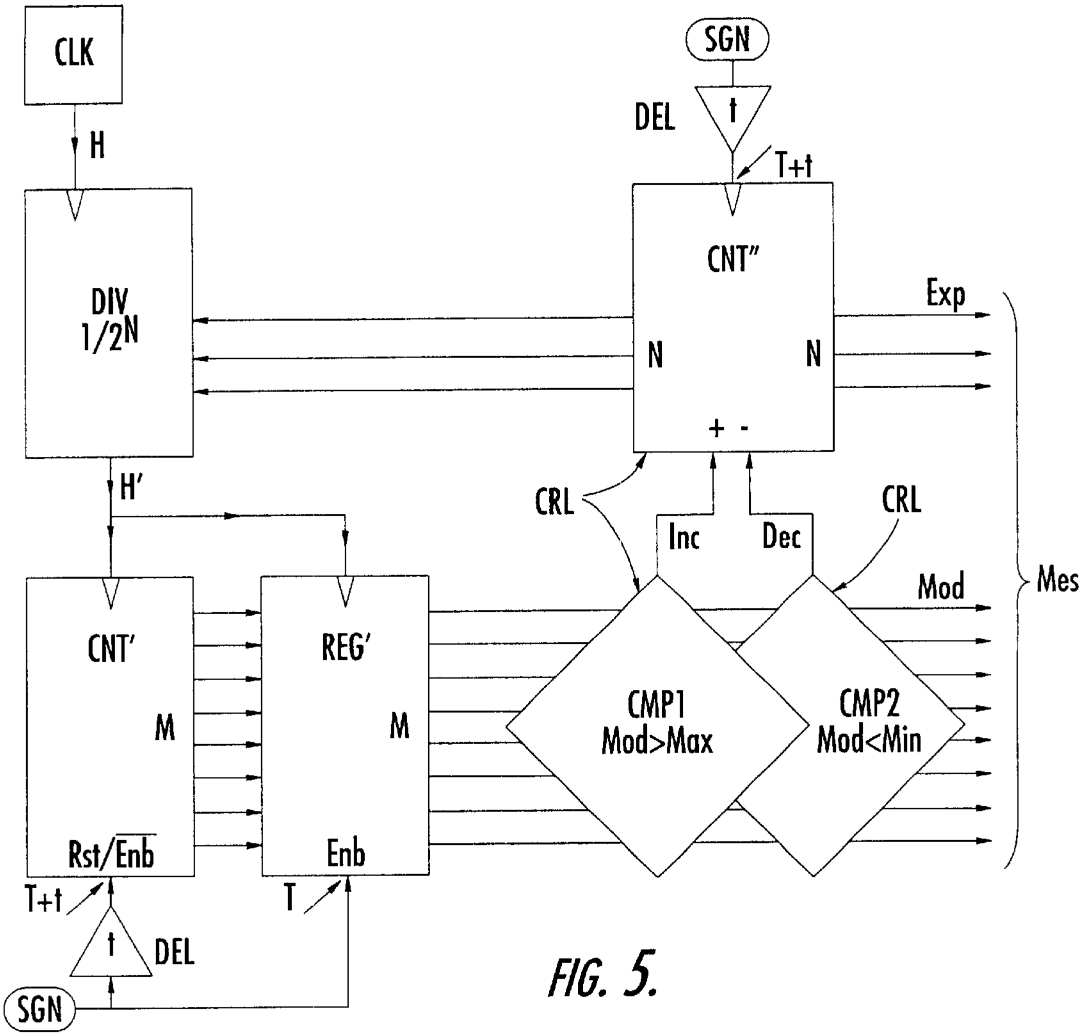
FIG. 5 illustrates a second embodiment of the time interval measurement circuit according to the present invention.

FIG. 5 shows that the measurement circuit has a generator CLK of primary pulses H, a programmable $½^N$ frequency divider DIV generating the secondary pulses H', a counter CNT' and a register REG' in a manner similar to the drawing of FIG. 2. In this preferred embodiment, the self-calibration means, namely the negative feedback loop CRL, are formed by comparators CMP1 and CMP2 connected to control inputs of a second counter CNT" whose outputs provide the digital factor N for the programming of the frequency division $½^N$. The first comparator CMP1 receives, at an input, the binary number M resulting form the counting which is copied by the register REG'. The first comparator tests the value of the binary number M received with respect to the maximum threshold value Max. The output Inc of the first comparator CMP1 is connected to a (+) input to order the increment of the counter CNT". Similarly, the second comparator CMP2 receives the binary number M and makes a comparison with a minimum threshold value Min. The output Dec of the second comparator CMP2 is connected to a (–) input to order the decrement of the counter CNT".

In the example of FIG. 5, the digital factor N is encoded on 3 bits that are given by three outputs of the counter CNT". These outputs N are connected to the input of the frequency divider DIV, and to the output Exp of the circuit itself. The counter CNT" is synchronized by the signal Sgn pulses delayed by a period t covering the transfer times in the register REG', and the by times for making comparisons CMP1 and CMP2.

In operation, the binary number M, representing the modulus Mod of the measurement computed by the counter CNT' and reproduced by the register REG', is compared with the minimum threshold Min and the maximum threshold Max by the comparators CMP1 and CMP2. Should the maximum threshold Max be crossed, the comparator CMP1 activates the increment line Inc and the counter CNT" increases the digital factor N by one increment. Conversely, in the event of counting below the minimum threshold Min, the second comparator CMP2 activates the decrement line Dec. The line Inc is inactive when the minimum threshold Min is below the maximum threshold Max, and the counter CNT" reduces the digital factor N by one decrement.

In contrast, when the counting gives a binary number M between the minimum threshold Min of the second comparator CMP2 and the maximum threshold Max of the first comparator CMP1, neither the increment line Inc nor the decrement line Dec is activated. The counter CNT" then does not modify the value of the digital factor that it chooses and provides at the output. Advantageously, the second embodiment makes it possible to directly obtain a condensed binary encoding N of the digital factor without any encoding circuit.

Another advantage of the second embodiment of the measurement circuit is that it makes it possible to set the thresholds Min and Max at any value. For example, assuming that the measurement circuit has an 8-bit binary format as in FIG. 5, the minimum threshold Min may be set at the value 100 to obtain an exact measurement precision of 1%, and the maximum threshold Max may be set at a value 200, which is twice the minimum value since the calibration of the frequency divider increases by steps of two.

Figure 6:
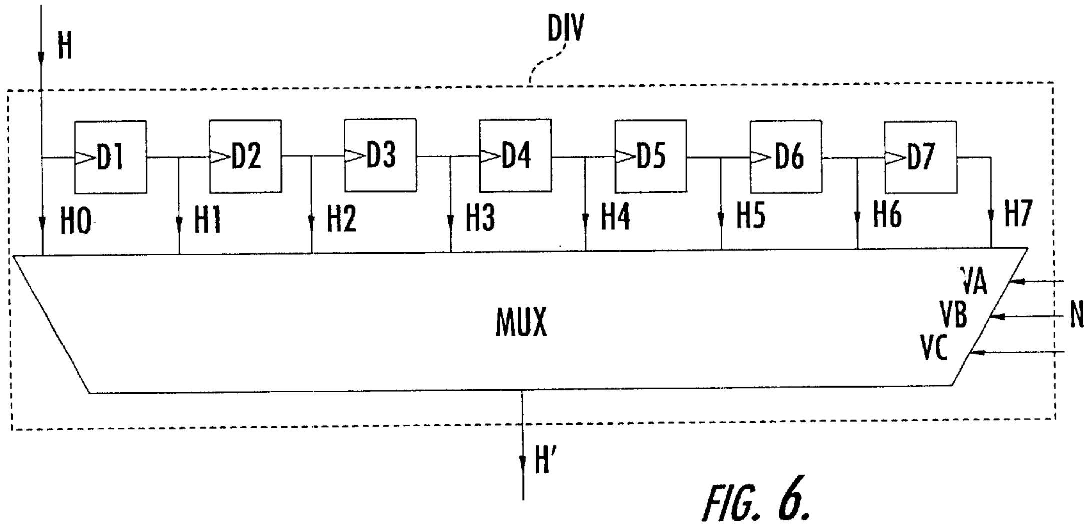
FIG. 6 illustrates an alternative embodiment of a frequency divider implemented in the second embodiment of the time interval measurement circuit illustrated in FIG. 5.

FIG. 6 shows another exemplary embodiment of the frequency divider DIV adapted to the preferred embodiment. The lines that transmit the condensed binary code N of the digital factor are applied as inputs to a multiplexer Mux. From the primary periodic pulses H and H0, a series of latches D1 to D7 gives a series of periodic pulses H1 to H7. An output of latches D1 is routed to the input of the multiplexer Mux, whose output gives the secondary periodic pulses H' designed for the counter. Thus, depending on the multiplexer command digital factor N, this multiplexer selects on of the outputs of the latches and transmits the periodic pulses with a frequency corresponding to the division $½^N$.

The programmable frequency divider circuit DIV may be made, as an alternative, by associating a counter synchronized by the primary pulses and a multiplexer (not shown). The measurement circuit according to the invention may take the form of many alternatives and embodiments, of which only a few examples have been described in the present description. The invention is therefore not limited by the embodiments described here above nor even by the names of the circuits such as decoder, comparator, register, counter, encoder, series of latches and multiplexer implemented in the above exemplary embodiments. In other words, these circuits have a plurality of functional equivalents which may be interchangeable, as readily appreciated by one skilled in the art.

Figures 7A, 7B, 7C, 7D, 7E, 7F, 7G:
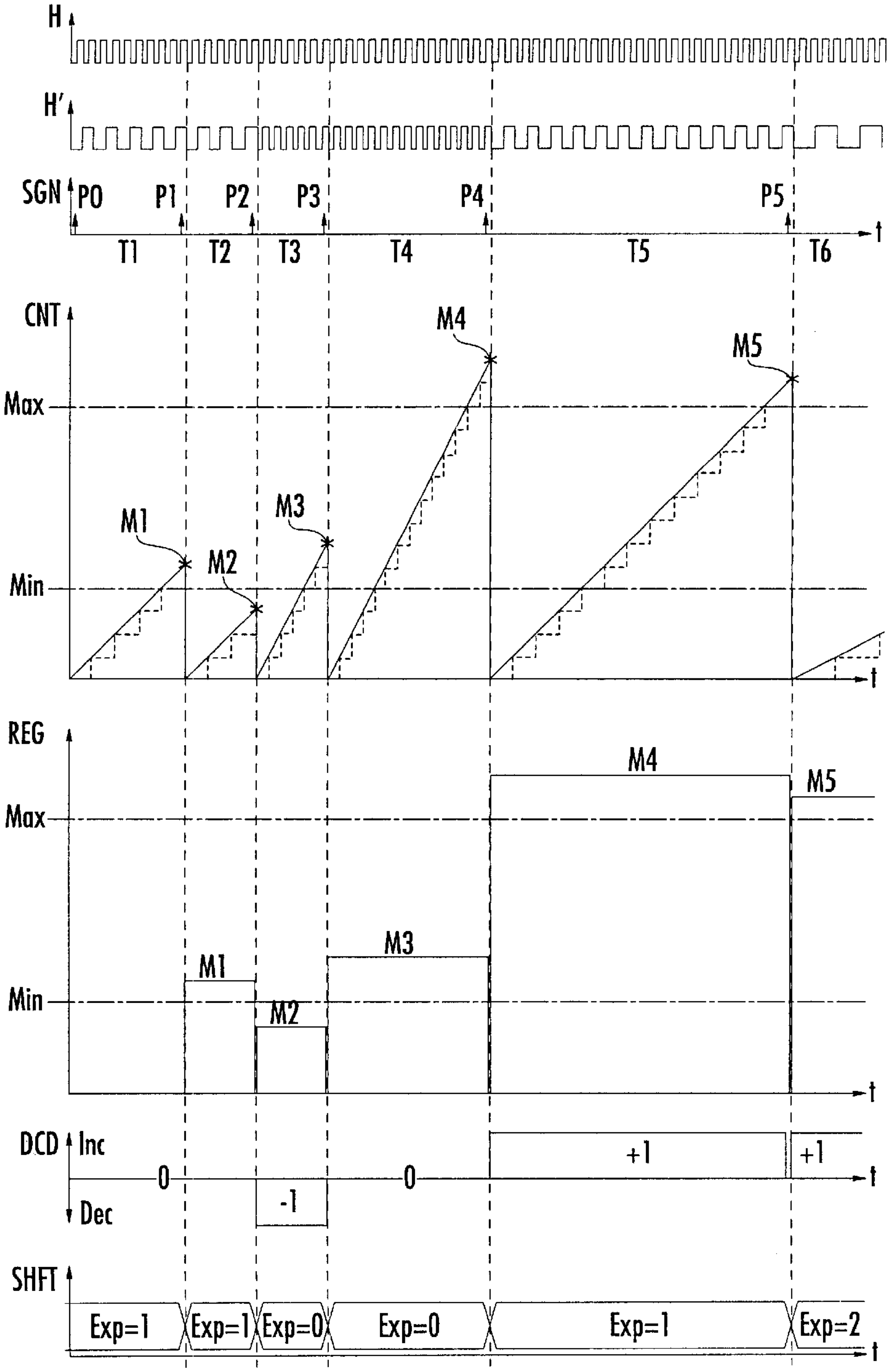
FIGS. 7*a*–7*g* illustrate various timing signals for the time interval measurement circuit according to the present invention.

To illustrate operation of the measurement circuit according to the present invention, an example of measurement steps shall be explained before a detailed description is given of an advantageous application of the circuit. FIG. 7 provides an example in the form of timing diagrams of an exemplary exchange of signals that could be made within the circuit of FIG. 3 or the circuit of FIG. 5.

Referring to timing diagram 7*c*, at the beginning during the measurement of a first time interval T1 between a first pulse P0 and a second pulse P1 of a signal Sgn, the shift register SHFT delivers a digital factor Exp with a value 1, i.e, it enables its first line n0=000000001. The frequency divider DIV is therefore programmed to divide the frequency of the primary pulses H by half, As can be seen in the timing diagrams 7*a* and 7*b*, the period of the secondary pulses H' is then twice the period of the primary pulses H. The counter CNT gets incremented by one unit at each secondary pulse edge H' in following the mean slope of the first ramp of the timing diagram 7*d*.

The pulse P1, which ends the time interval T1, prompts the transfer of the result M1 of the counting into the register REG which preserves this result M1 after the second pulse P1 and the resetting of the counter CNT. Sinc the result M1 of the measurement of the first interval T1 is contained between the thresholds Min and Max, the decoder gives neither an increment signal Inc nor a decrement signal Dec, and the shift register keeps the value 1 of the digital factor Exp. The secondary pulses H' therefore keep a frequency which is half that of the primary pulses H during the second time interval T2.

According to the example of the timing diagram 7*d*, the interval T2 ends with a third pulse P2 which interrupts the counting at a value M2 below the minim threshold Min. The measurement circuit then gives the result (M2, 1) which may be affected by a certain error, but is automatically recalibrated. In the timing diagram 7*f*, the decoder DCD gives a decrement signal Dec so that the digital factor Exp diminishes by one unit to reach a zero value. Thus, after the pulse P2 of a signal Sgn ends the interval T2, the frequency divider no longer scales down the primary pulses H, and the counter CNT receives secondary pulses H' having the same period as the clock, thus attaining the maximum counting frequency.

The counter CNT then gets incremented twice as fast as it does during the previous intervals T1 and T2, in following the maximum slope of the third ramp of the timing diagram 7*d*. In the example of FIG. 7, the time intervals T2 and T3 have an equal duration, but the result modulus M3 of the measurement of the interval T3 reaches a double value. This double value is represented by a double binary number. The measurement exponent Exp, in the meantime, has been reduced by a decrement. The lack of precision of the measurement M3 is then diminished by half as compared with the imprecision of measurement M2, and remains within the limits defined during the choice of the After the measurement of a time interval T4, whose result has a modulus M4 exceeding the maximum threshold Max, the decoder DCD activates an incrementation signal Inc. The shift register SEFT is then incremented by one unit and the digital factor Exp returns to the unit value. The next time interval T5 is therefore measured at a frequency which is half the clock frequency. The counting ramp of the counter CNT follows a mean slope. threshold Min and of the digital counting format.

As in the example of the timing diagram 7*d*, the measurement of the time interval T5 gives a modulus M5 that is greater than the maximum threshold Max, and the circuit again gets recalibrated. When the pulse P5 ends the time interval T5, the register stores the value M5 that crosses the threshold Max and the decoder DCD again gives a +1 active increment signal Inc. The shift register SHFT then gets incremented and the digital factor Exp goes to a value 2. Consequently, after the pulse P5, the frequency divider is programmed to scale down the frequency of the pulses transmitted in a ratio of four, i.e., $2^2$. The frequency of the secondary periodic pulses H' therefore reaches a quarter of the frequency of the primary pulses H. Hereinafter, the following measurement is made at a reduced rate. The ramp for the counting of the time interval T6 has a small slope.

An advantage is that the measurement circuit gets recalibrated automatically as a function of the progress of the measurements of time intervals. Another advantage of the automatic recalibration is that the precision of the measurements are kept at a high level despite the varying of the measurements over a wide range.

The measurement circuit according to the present invention is particularly appropriate to the control of the time or angle of lag of synchronous motors, such as permanent magnet direct current motors (PMDC). DC motors, known as PMDCs, have the particular feature of having a permanently magnetized rotor and a multipolar stator generating a rotating field that drives the motion of the magnetized rotor.

FIG. 8 illustrates an exemplary three-pole PMDC motor with six paired coils a', b', c', a", b", c". The three pairs of coils a'–a", b'–b" and c'–c" are interconnected between a respective terminal A, B or C and a common wire N forming a neutral point. At each operating instant, two pairs of coils are powered to the exclusion of the third pair of coils. Thus, according to the example of FIG. 8, when the magnetized rotor N–S passes substantially into the axis of the coils c' and c", the pair of coils c'–c" is not powered while the other coils a'–a" and b'–b" are crossed by an electrical current that generates a magnetic field (represented by arrows) and attracts the magnetized rotor N–S to force it to rotate. In order that the magnetized field may rotate at the same time as the rotor, it is necessary to regularly permute the electrical current in terms of voltage +U, −U applied to two of the three coil terminals A, B, C of the three-pole stator.

For this purpose, an electronic switching system permutes in cycles the electrical supply of the terminals A, B, C of the motor, for example, according to the cycles of phases 1, 2, 3, 4, 5, 6 and 1', 2', . . . as illustrated in FIG. 9 with reference to the PMDC motor of FIG. 8.

An advantage of PMDC motors as compared with conventional DC motors is that they do away with the need for brush and collector switching mechanisms which have a short lifetime and can not withstand high voltages or high power spikes. The PMDC motors are reliable and robust, especially for domestic applications. When operating at standard capacity, the rotor of a PMDC motor has an angular speed identical to that of the rotating field (synchronous motor). The rotor then has an angle of lag in relation to the magnetic field that varies depending on the load or acceleration sustained by the motor. However, the motor may stall, i.e., the speed of rotation of the rotating field may become greater than that of the rotor. This phenomenon occurs especially during starting, since the rotor is immobile, as well as under the effect of an excessive load.

To prevent the phenomenon of stalling, the switching system must modulate the duration of the phases according to the speed of the rotor and which must get synchronized with the angular position of the rotor to activate the phase switching. Usually, an angular sensor or a special detection coil gives a measurement of angular position to the electronic system to make it possible for it to be synchronized.

One particularly advantages method for controlling a multipolar PMDC motor provides for the use of the coils of the stator, each in turn, as an angular position detector. Each excitation coil is used in detection during the phases where it is not crossed by an excitation current. It can thus be seen in the detailed view 9D of the timing diagram 9C of FIG. 9 that, during the phase 1' when the terminal C of the motor of FIG. 8 is not powered, an induced voltage appears at this terminal C. This induced voltage varies continually from a low negative value −v to a low positive value +v. The values +v, −v of the induced voltage are positive or negative with respect to the neutral N which, by convention, has a zero potential 0.

Thus, the measurement of the voltage induced at the terminals of each polar coil during its non-supply phase provides or indicates the angular position of the rotor. By way of an example, when the rotor of the motor goes into the angular position illustrated in FIG. 8, the voltage at the terminals of the coils c', c" reaches the level indicated by the line of dashes 8 in FIG. 9D. The voltage of the terminal C is with respect to the neutral N. The induced voltage changes its sign 0 when the axis N-S of the rotor crosses the axis of the corresponding pair of coils c'–c".

The electronic control system of the motor must then have a measurement of the lag of the rotor with respect to the rotating field to compute the switching instants of the phases 1, 2, 3, 4, 5, 6, 1', 2', etc. One problem encountered is that the lag of the rotor takes values that extend over a very wide range depending on the rate of operation of the motor. When starting, the lag assumes considerable values. Ultimately, it may be assumed that when the motor stops, the lag of the rotor is infinite. However, in steady operation, the lag of the rotor is the minimum.

According to the invention, the measurement circuit advantageously makes it possible to measure the lags of the rotor with respect to the rotating field produced by the stator. More specifically, the time intervals between two passages are measured through a threshold value (0) of an induced voltage (+v, −v) in one or more polar coils of the stator. This is when the coil or coils are not powered.

To measure the time intervals between the beginning of each biasing phase 1' and the instant 0 when the detected voltage v changes its sign with respect to the neutral N, the switching instants are computed so that the motor rotates optimally. As an alternative, it is possible to measure the time interval between two instants 0 when the detected voltage v changes its sign with respect to the neutral. The two instants 0 belonging to two distinct biasing phases.

The prime advantage of the measurement of the lag of a PMDC motor with a circuit is that of obtaining measurements of time with constant precision, regardless of the operating state of the motor. Another advantage is that the measurement of the lag of a PMDC motor with a circuit according to the invention provides for direct control of the phase changing times. It is planned that the duration of the end of a biasing phase is proportional to the duration of the beginning of the biasing phase. This advantageously makes it possible to stabilize the value of the angle of lag.

To take a simple example illustrated in FIG. 9D, the electronic switching system may compute the instant +v at the end of the phase 1' in such a way that the time interval between the instant 0 corresponding to the change of sign of the detection voltage, and the instant +v corresponding to the end of the phase 1' are equal to the measurement of the time interval between the instant −v of the beginning of the phase 1' and the instant 0. The duration of each phase is then twice the lag of the rotor. This keeps the angle of lag of the rotor in relation to the rotating field at about −90°.

To double the value of the lag, the end of phase duration is reduced by decrementing a binary counter initially loaded with the binary result of the measurement of the phase start duration. As an alternative, since the measurement circuit gives digital results in binary form, the doubling of each time interval measurement can advantageously be obtained by shifting of the bits of the measurement result. More generally, by applying the output bits of the measurement circuit, which correspond to the modulus Mod of the numerical measurements Mes, to the input of a shift register, the measurement of time can be doubled, quadrupled, octupled, etc. A binary command can even modulate the coefficient of proportionality between the end of phase duration and the beginning of phase time measurement.

Those skilled in the art may consider other possibilities of direct or semi-direct use of the results given by the time interval measurement circuit for the computation of switching instants corresponding to various angles of lag, e.g., 30°, 45°, 60°, 90°, . . . Other values of angles of lag may also be chosen by setting a rational coefficient of proportionality between the beginning duration and the end duration of each phase.

It is useful to keep the angle of lag of the rotor with respect to the rotating field around a mean value because this makes it possible to prevent the PMDC motor from stalling. The measurement circuit can be used especially for integration in an electronic system for the control of a PMDC synchronous motor, such as a microcontroller dedicated to such applications. It can also be integrated into the 8-bit microcontroller circuit referenced as ST72.141, which was developed by the assignee of the present invention.

Other exemplary applications of the measurement circuit according to the invention for the control of a PMDC synchronous motor can be provided by referring to U.S. Pat. No. 5,859,520 titled "Control Of A Brushless Motor." This patent claims priority to the French Patent FR-A-2 747 521, titled "Control Of A Motor Without Collector." These patents provided a more detailed description of the methods for controlling a PMDC synchronous motor. The time interval measurement circuit according to the invention can again be applied to the measurement of the slip rate of a synchronous motor. Other applications, alternative embodiments and improvements may be implemented by those skilled in the art without departing from the framework of the present invention, the scope of which is defined by the following claims.

That which is claimed is:

1. A time interval measurement circuit comprising:

a generator for generating primary periodic pulses;

a frequency divider for transmitting secondary periodic pulses for scaling down a frequency of the primary periodic pulses, a frequency division of said frequency divider being programmable by a digital factor;

counting means for counting the secondary periodic pulses transmitted during a measured time interval; and self-calibration means for modifying the digital factor as a function of a number of the secondary periodic pulses counted by said counting means during a previous time interval measurement.

2. A time interval measurement circuit according to claim 1, wherein said frequency divider scales down the frequency of the transmitted secondary periodic pulses by the digital factor raised to a power of two.

3. A time interval measurement circuit according to claim 1, wherein said frequency divider comprises a series of latches, each latch dividing the frequency of the transmitted secondary periodic pulses by two; and wherein the digital factor enables an output of said series of latches.

4. A time interval measurement circuit according to claim 1, wherein said self-calibration means comprises a negative feedback loop incrementing the digital factor when the number of secondary periodic pulses counted by said counting means is greater than a predetermined threshold.

5. A time interval measurement circuit according to claim 4, wherein said negative feedback loop increases the digital factor by on e increment when the number of secondary periodic pulses is greater than a maximum threshold, reducing the digital factor by one decrement when the number of secondary periodic pulses is below a minimum threshold, and does not modify the digital factor when the number of secondary periodic pulses is between a minimum threshold and a maximum threshold.

6. A time interval measurement circuit according to claim 1, wherein said self-calibration means comprises at least one comparator having an input for receiving a binary number.

7. A time interval measurement circuit according to claim 1, wherein said self-calibration means comprises a binary decoder having an input for receiving the number of secondary periodic pulses counted by said counting means.

8. A time interval measurement circuit according to one of the claim 1, wherein said self-calibration means comprises a shift register providing an output value corresponding to the digital factor, the output value being incremented or decremented by said shift register.

9. A time interval measurement circuit according to claim 1, wherein said self-calibration means comprises a counter providing a condensed binary code of the digital code, the condensed binary code being incremented or decremented by said counter.

10. A time interval measurement circuit according to claim 1, wherein said counting means provides a binary number representing a modulus of a time interval measurement result; and wherein said self-calibration means provides a digital number representing an exponent of the time interval measurement result.

11. A time interval measurement circuit according to claim 1, wherein a time interval measurement result corresponds to a lag interval for a synchronous motor.

12. A time interval measurement circuit comprising:

a generator for generating primary periodic pulses;

a frequency divider for transmitting secondary periodic pulses for scaling down a frequency of the primary periodic pulses, a frequency division of said frequency divider being programmable by a digital factor;

a counter for counting the secondary periodic pulses transmitted during a measured time interval; and a negative feedback loop for modifying the digital factor as a function of a number of the secondary periodic pulses counted by said counter during a previous time interval measurement.

13. A time interval measurement circuit according to claim 12, wherein said frequency divider scales down the frequency of the transmitted secondary periodic pulses by the digital factor raised to a power of two.

14. A time interval measurement circuit according to claim 12, wherein said frequency divider comprises a series of latches, each latch dividing the frequency of the transmitted secondary periodic pulses by two; and wherein the digital factor enables an output of said series of latches.

15. A time interval measurement circuit according to claim 12, wherein said negative feedback loop incrementes the digital factor when the number of secondary periodic pulses counted by said counter is greater than a predetermined threshold.

16. A time interval measurement circuit according to claim 15, wherein said negative feedback loop increases the digital factor by one increment when the number of secondary periodic pulses is greater than a maximum threshold, reducing the digital factor by one decrement when the number of secondary periodic pulses is below a minimum threshold, and does not modify the digital factor when the number of secondary periodic pulses is between a minimum threshold and a maximum threshold.

17. A time interval measurement circuit according to claim 12, wherein said negative feedback loop comprises at least one comparator having an input for receiving a binary number.

18. A time interval measurement circuit according to claim 12, wherein said negative feedback loop comprises a binary decoder having an input for receiving the number of secondary periodic pulses counted by said counter.

19. A time interval measurement circuit according to claim 12, wherein said negative feedback loop comprises a shift register providing an output value corresponding to the digital factor, the output value being incremented or decremented by said shift register.

20. A time interval measurement circuit according to claim 12, wherein said negative feedback loop comprises a counter providing a condensed binary code of the digital code, the condensed binary code being incremented or decremented by said counter.

21. A time interval measurement circuit according to claim 12, wherein said counter provides a binary number representing a modulus of a time interval measurement result; and wherein said self-calibration means provides a digital number representing an exponent of the time interval measurement result.

22. A time interval measurement circuit according to claim 12, wherein a time interval measurement result corresponds to a lag interval for a synchronous motor.

23. A system for controlling a synchronous motor comprising:

a time interval measurement circuit for measuring lag intervals of the synchronous motor, said time interval measurement circuit comprising a generator for generating primary periodic pulses, a frequency divider for transmitting secondary periodic pulses for scaling down a frequency of the primary periodic pulses, a frequency division of said frequency divider being programmable by a digital factor, a counter for counting the secondary periodic pulses transmitted during a measured time interval, and a self-calibration circuit for modifying the digital factor as a function of a number of the secondary periodic pulses counted by said counter during a previous time interval measurement.

24. A system according to claim 23, wherein the synchronous motor comprises a magnetized rotor and a multipolar wound stator; and wherein the measured lag intervals are of the magnetized rotor with respect to a rotating magnetic field produced by the multipolar wound stator.

25. A system according to claim 24, wherein the multipolar wound stator comprises a plurality of polar coils; and wherein said time interval measurement circuit measures time intervals separating two passages through a threshold value of an induced voltage in at least one of the plurality of polar coils when not powered.

26. A system according to claim 24, wherein the multipolar wound stator comprises a plurality of polar coils; and wherein the measured lag intervals of the magnetized rotor are used to control a duration of phase of supply to the plurality of polar coils.

27. A system according to claim 23, wherein said frequency divider scales down the frequency of the transmitted secondary periodic pulses by the digital factor raised to a power of two.

28. A system according to claim 23, wherein said frequency divider comprises a series of latches, each latch dividing the frequency of the transmitted secondary periodic pulses by two; and wherein the digital factor enables an output of said series of latches.

29. A system according to claim 23, wherein said self-calibration circuit comprises a negative feedback loop incrementing the digital factor when the number of secondary periodic pulses counted by said counter is greater than a predetermined threshold.

30. A system according to claim 29, wherein said negative feedback loop increases the digital factor by one increment when the number of secondary periodic pulses is greater than a maximum threshold, reducing the digital factor by one decrement when the number of secondary periodic pulses is below a minimum threshold, and does not modify the digital factor when the number of secondary periodic pulses is between a minimum threshold and a maximum threshold.

31. A system according to claim 23, wherein said self-calibration circuit comprises at least one comparator having an input for receiving a binary number.

32. A system according to claim 23, wherein said self-calibration circuit comprises a binary decoder having an input for receiving the number of secondary periodic pulses counted by said counter.

33. A system according to claim 23, wherein said self-calibration circuit comprises a shift register providing an output value corresponding to the digital factor, the output value being incremented or decremented by said shift register.

34. A system according to claim 23, wherein said self-calibration circuit comprises a counter providing a condensed binary code of the digital code, the condensed binary code being incremented or decremented by said counter.

35. A system according to claim 23, wherein said counter provides a binary number representing a modulus of a time interval measurement result; and wherein said self-calibration circuit provides a digital number representing an exponent of the time interval measurement result.

36. A method for measuring time intervals comprising the steps of:

generating primary periodic pulses;

transmitting secondary periodic pulses for scaling down a frequency of the primary periodic pulses, the scaling being programmable by a digital factor;

counting the secondary periodic pulses transmitted during a measured time interval; and modifying the digital factor as a function of a number of the secondary periodic pulses counted during a previous time interval measurement.

37. A method according to claim 36, wherein the step of scaling comprises scaling down a frequency of the transmitted secondary periodic pulses by the digital factor raised to a power of two.

38. A method according to claim 36, wherein the step of modifying comprises implementing a negative feedback loop incrementing the digital factor when the number of secondary periodic pulses counted is greater than a predetermined threshold.

39. A method according to claim 38, wherein the step of implementing a negative feedback loop comprises implementing the negative feedback loop for increasing the digital factor by one increment when the number of secondary periodic pulses is greater than a maximum threshold, reducing the digital factor by one decrement when the number of secondary periodic pulses is below a minimum threshold, and not modifying the digital factor when the number of secondary periodic pulses is between a minimum threshold and a maximum threshold.

40. A method according to claim 36, wherein the step of modifying comprises providing a condensed binary code of the digital code.

41. A method according to claim 36, wherein the step of counting provides a binary number representing a modulus of a time interval measurement result; and wherein the step of modifying provides a digital number representing an exponent of the time interval measurement result.

42. A method according to claim 36, wherein the time interval measurement result corresponds to a lag interval for a synchronous motor.

* * * * *

UNITED STATES PATENT AND TRADEMARK OFFICE
CERTIFICATE OF CORRECTION

PATENT NO. : 6,404,161 B1
DATED : June 11, 2002
INVENTOR(S) : David Roubinet and Stéphane Guilhot It is certified that error appears in the above-identified patent and that said Letters Patent is hereby corrected as shown below:

Column 5,
Line 19, delete "form" insert -- from --

Column 7,
Line 27, delete "form" insert -- from --

Column 9,
Line 22, insert to the end of sentence after "of the" -- threshold Min and of the digital counting format. --

Column 12,
Line 42, delete "o ne" insert -- one --

Signed and Sealed this

Third Day of December, 2002

JAMES E. ROGAN
*Director of the United States Patent and Trademark Office*